2,887,394

METHOD OF MAKING A NONPOROUS, SEMI-CRYSTALLINE CERAMIC BODY

Fred A. Bickford, Campbell, and Robert Karl Smith, Corning, N.Y., assignors to Corning Glass Works, Corning, N.Y., a corporation of New York No Drawing. Application April 4, 1956
Serial No. 575,976

4 Claims. (Cl. 106—46)

This invention relates to dielectric insulating materials and methods of making them and particularly to a method of making a material having electrical, mechanical, and other properties making it suitable for use as an envelope or part of an envelope for an electronic tube capable of operating at a frequency of 10,000 or more megacycles or a wave length of 3 cm. or less. To be suitable for use in such high frequency tubes, and particularly for use in their walls which become highly heated in use, the dielectric parts must resist the tendency to collapse under the pressure of the atmosphere and, therefore, should have a deformation temperature under vacuum of 1000°–1300° C. or higher and preferably 1500° C., a thermal expansion coefficient in the range $55$–$80 \times 10^{-7}$ but not over $100 \times 10^{-7}$ per ° C. to permit metallizing the body and soldering it to easily machinable metal parts at temperatures up to 1300° C., a tensile or flexural strength not less than 15,000 pounds per square inch (p.s.i.) and preferably 25,000 or more, a dielectric constant below 9 and preferably 5 or less, and an electrical loss factor (product of loss tangent and dielectric constant) not greater than 0.02 but preferably 0.01 or lower.

Prior electronic tubes, which operate at relatively low frequencies and which are not subjected to temperatures higher than about 700° C. in their operation, utilize glass parts. Glasses which are suitable for such prior electronic tubes, however, are not suitable for the present high frequency tubes, since no glass possesses all of the necessary characteristics. While some glasses have satisfactory electrical characteristics at room temperature, the dielectric losses of most glasses, particularly if they contain an alkali metal oxide, are objectionably high at 500° C. or above; glasses having suitable expansion coefficients soften at temperatures too low for the present purpose, since usually the higher the thermal expansion coefficient of a glass the lower its softening point; and, moreover, glass lacks adequate mechanical strength.

To avoid these difficulties semi-crystalline ceramic bodies have been utilized which are composed of a refractory metal oxide or silicate such as alumina, zircon, steatite, and forsterite bonded by mixing the refractory material with other individual metal oxides and/or silicates such as $TiO_2$, $MnO_2$, $Fe_2O_3$, MgO, CaO, talc, bauxite, and kaolin, and shaping and firing the mixture at a temperature between 1400° and 1700° C. Such ceramic bodies have adequately high deformation temperatures under vacuum, outstanding mechanical strength as compared with glass, and suitable thermal expansion coefficients, but have unpredictably variable electrical properties which, at some temperatures and frequencies, are not even as good as those of prior glasses. An undesirably long time is required for firing such bodies in order to bring them to a well bonded non-porous state, since the individual oxides and silicates used as bonding materials are themselves quite refractory. We have found that such drastic treatment is responsible, at least in part, for the objectonable variation in their electrical properties.

It is an object of this invention to overcome such difficulties and to produce a non-porous, semi-crystalline ceramic body, having the aforesaid desirable properties and being suitable for use as an envelope or part of an envelope for an electronic tube capable of operating at a frequency of 10,000 megacycles or more.

According to the invention such a body is made by intimately mixing finely divided alumina and a finely divided glass, which by analysis is free of alkali metal oxide, in the proportions of 60% to 95% alumina and 40% to 5% glass, molding the mixture to the desired shape and heating the shaped body at about 1400°–1625° to fuse the glass and bond the alumina as rapidly as possible.

It has been found that a body having an alumina to glass ratio of lower than about 60/40 is unsuitable because of low mechanical strength and low deformation temperature under vacuum, while a ratio higher than 95/5 is impractical because in such a body there is insufficient glass present to properly bond the alumina particles.

We have found that glasses which consist essentially of 15% to 75% $SiO_2$, up to 45% $Al_2O_3$, and 10% to 60% of at least one of the alkaline earth metal oxides BeO, MgO, CaO, SrO, BaO and especially CaO and BaO, are particularly suitable, although other silicate glasses which are substantially free of alkali metal oxide may be used to obtain at least some of the benefits of the invention. Particularly desirable electrical properties are produced by a glass consisting essentially of 60% $SiO_2$, 14% $Al_2O_3$, 16% CaO, and 10% BaO.

The difficulties encountered in the production of prior semi-crystalline bodies for this purpose are due to the prior heterogeneous bonding materials and to the longer firing time required thereby, which caused bubbles in the matrix and excessive dissolution of the alumina therein. We have found that a much shorter firing time, say about 4 hours, not only suffices for the present compositions but results in a much better product. Such rapid firing of the alumina-glass mixture forms no bubbles and diminishes the tendency for the alumina to dissolve in the glass and, if the glass has particularly good electrical characteristics, it results in a product of superior electrical properties. These desirable results are obtained only if the glass for the bond is premelted. Substitution of an unmelted glass batch in lieu of the premelted glass tends to cause some dissolution of the alumina and is not suitable for our purpose.

The premelting of the constitutents of the bond also eliminates the volatile components thereof which might form bubbles or voids in the glassy matrix of the crystalline body and provides an amorphous glassy bond, having a lower melting or softening point than its individual refractory oxides and/or silicates. When thus premelted, such a glassy bond flows more readily to surround the individual particles of alumina and to bond them into a dense, non-porous, mass.

Since the softening points of glasses most suitable for our purpose do not exceed about 900°–1000° C., it is all the more surprising that a body bonded with such a glass should have a deformation temperature under vacuum so far above the softening point of the glass which is used as the bond.

The following examples, 1, 2, and 3, show compositions of the new semi-crystalline ceramic bodies of the invention in percent by weight together with their specific gravities (Sp. Gr.), deformation temperatures under vacuum (D. Temp.), thermal expansion coefficients (Exp. Coeff.), flexural strengths (Flex. Str.), dielectric constants, loss tangents, and loss factors. The premelted glass composition utilized in Examples 1, 2 and 3 consists of approximately 60% $SiO_2$, 14% $Al_2O_3$, 16% CaO, and 10% BaO and has a softening point of 960° C. For comparison the properties of a prior bonded alumina ceramic are set forth as Example 4. The bonding agent thereof consists of a mixture of metal oxides and/or silicates, as indicated above, which are converted to a glass during firing.

|  | 1 | 2 | 3 | 4 |
|---|---|---|---|---|
| $Al_2O_3$ percent | 60 | 80 | 90 | 85 |
| Glass do | 40 | 20 | 10 | 15 |
| Sp. Gr. | 3.08 | 3.36 | 3.46 | 3.40 |
| D. Temp., ° C | 1,350 | 1,400 | 1,475 | 1,400 |
| Exp. Coeff. × $10^7$ | 54.1 | 62.4 | 64.4 | 64.3 |
| Flex. Str., p.s.i. | 23,000 | 32,000 | 42,000 | 42,000 |
| Dielectric Const.: | | | | |
| 1 K cycle @: | | | | |
| 25° C | 8.82 | 8.54 | 7.6 | 8.18 |
| 450° C | 10.0 | 9.8 | 9.0 | 13.86 |
| 1 M cycle @: | | | | |
| 25° C | 8.55 | 8.54 | 7.5 | 8.16 |
| 500° C | 9.40 | 9.10 | 8.2 | 8.87 |
| Loss Tangent: | | | | |
| 1 K cycle @: | | | | |
| 25° C | .0007 | .0007 | .0003 | .001 |
| 450° C | .25 | .12 | .14 | .58 |
| 1 M cycle @: | | | | |
| 25° C | .0006 | .0007 | .0003 | .0009 |
| 500° C | .009 | .004 | .006 | .024 |
| Loss Factor: | | | | |
| 1 K cycle @: | | | | |
| 25° C | .006 | .006 | .003 | .011 |
| 450° C | 2.5 | 1.78 | 1.26 | 8.0 |
| 1 M cycle @: | | | | |
| 25° C | .005 | .006 | .002 | .007 |
| 500° C | .088 | .036 | .046 | .21 |

In the preparation of the compositions of Examples 1, 2, and 3 a finely powdered crystalline alumina having a particle size of minus 500 mesh and having an $Na_2O$ content less than 0.05% was used. The glass was crushed and reduced to a particle size of minus 300 mesh in a porcelain ball mill. The powdered materials, after being combined in the desired proportions by weight, were intimately mixed by the addition of water to form a slip and by agitation and grinding of the slip in a porcelain ball mill for about 24 hours. Thereafter a molded body was formed by slip casting. The molded bodies were then thoroughly dried and fired to a nonporous condition by heating them at a temperature between 1400° C.–1625° C. for about 4 hours, the temperature being higher as the proportion of $Al_2O_3$ in the composition is higher.

What is claimed is:

1. The method of making a non-porous, semi-crystalline, ceramic body which comprises intimately mixing finely divided alumina and a pre-melted and finely divided glass, which by analysis is free of alkali metal oxide, in the proportions of 60% to 95% alumina and 40% to 5% glass, molding the mixture to the desired shape and heating the shaped body at about 1400°–1625° C. to fuse the glass and bond the alumina as rapidly as possible.

2. The method of making a non-porous, semi-crystalline ceramic body which comprises intimately mixing finely divided alumina and a pre-melted and finely divided glass, which by analysis is free of alkali metal oxide and consists essentially of 15% to 75% $SiO_2$, up to 45% $Al_2O_3$, and 10% to 60% of an alkaline earth metal oxide, in the proportions of 60% to 95% alumina and 40% to 5% glass, molding the mixture to the desired shape and heating the shaped body at about 1400°–1625° C. to rapidly fuse the glass and bond the alumina.

3. The method of claim 2 in which the glass contains 16% of CaO and 10% of BaO.

4. The method of claim 3 in which the glass consists essentially of 60% $SiO_2$, 14% $Al_2O_3$, 16% CaO, and 10% BaO.

References Cited in the file of this patent
UNITED STATES PATENTS

| 2,220,775 | Navias | Nov. 5, 1940 |
| 2,760,875 | Schwartzwalder et al. | Aug. 28, 1956 |

FOREIGN PATENTS

| 686,246 | Great Britain | Jan. 21, 1953 |